United States Patent Office.

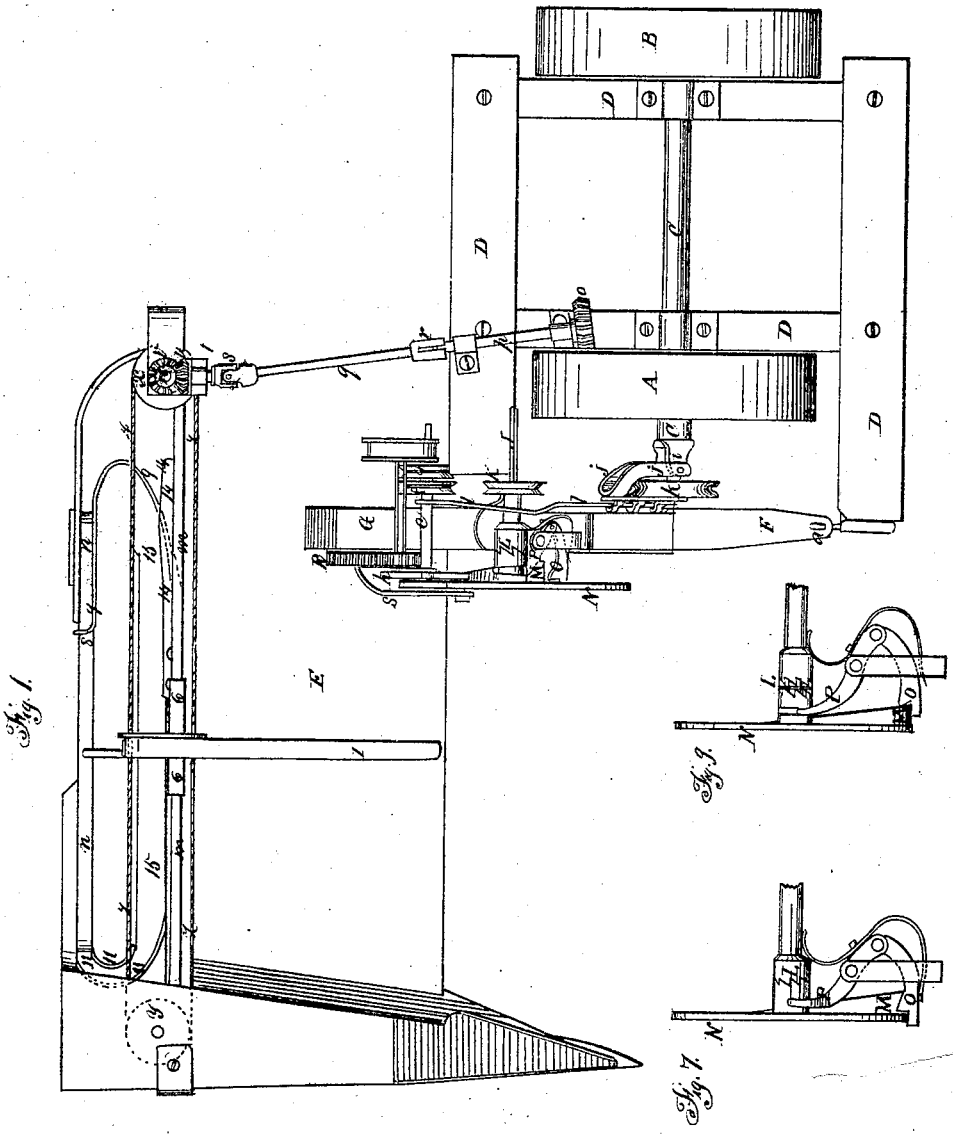

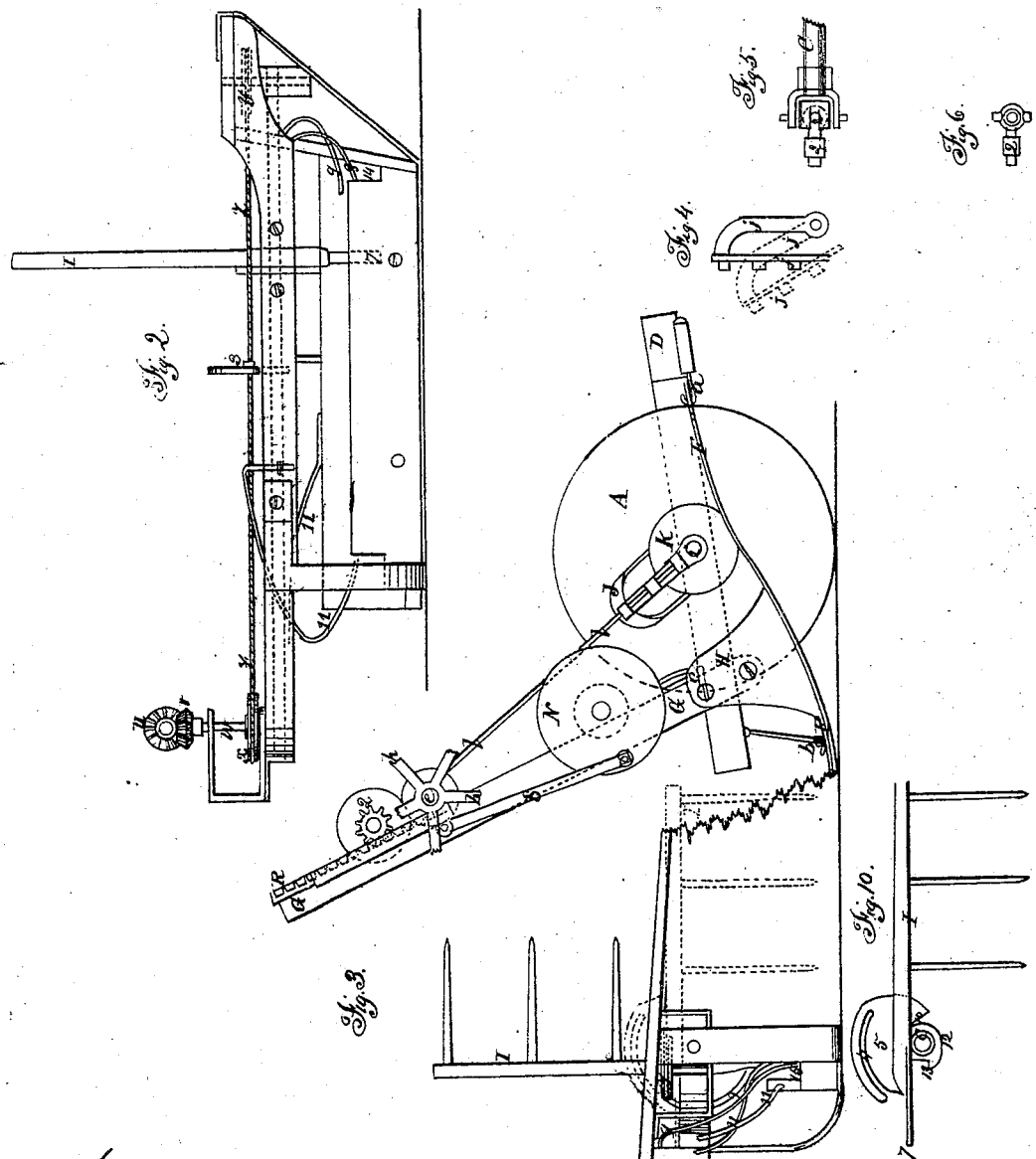

ROBERT D. BROWN, OF COVINGTON, INDIANA.

Letters Patent No. 72,599, dated December 24, 1867.

IMPROVEMENT IN HARVESTER-RAKES.

The Schedule referred to in these Letters Patent and making part of the same.

TO ALL WHOM IT MAY CONCERN:

Be it known that I, ROBERT D. BROWN, of Covington, in the county of Fountain, and State of Indiana, have invented certain new and useful Improvements in Self-Acting Rakes for Harvesting-Machines; and I do hereby declare the following to be a full, clear, and exact description of the same, reference being had to the accompanying drawings, making a part of this specification, in which—

Figure 1 represents a top plan of so much of a harvesting-machine as will illustrate my invention.

Figure 2 represents a rear elevation of the grain-table or platform, with the rake-mechanism and attachments shown thereon.

Figure 3 represents a side elevation of the machine, looking from the grain-side thereof.

Figures 4, 5, 6, 7, 9, and 10, represent detached portions of the mechanism, not distinctly seen in their changeable conditions in the other figures.

Similar letters of reference, wherever they occur in the several separate figures, denote like parts in all of the drawings.

My invention relates to mechanism for working a rake and a reel on a hinged platform, so that there shall be no cramping or binding of parts, or throwing off of belts, whilst the platform rises and falls at either or both of its ends, in conforming to the undulations of the ground over which it passes, and the carrying-wheels and main frame, containing the primary gearing or mechanism, rise and fall in accommodating themselves to the surface of the ground over which they pass, and which may differ in inclination from that over which the platform moves.

To enable others skilled in the art to make and use my invention, I will proceed to describe the same with reference to the drawings.

A B represent a pair of carrying and driving-wheels, upon an axle, C, on which they may work, fast and loose, in the well-known way, and for the well-known object; and upon the axle C is supported the main frame D. The platform or grain-table E is connected to the main frame by a coupling or drag-bar, F, that is attached to the main frame by yielding or hinged connections at $a$ and $b$, so that both the platform and the main frame may have different motions at one and the same time, in conforming to the ground over which they respectively pass.

The reel-post G is attached to and its inclination forward or backward made adjustable on the coupling or drag-bar F, by means of a plate, H, having a slotted arc $c$ in it, for an adjusting-screw, $d$, to take and work through. The reel-shaft $e$ is supported on this post G, and has upon it pulleys $f$ $g$, through one of which the reel $h$ is driven, and from the other of which motion may be transmitted to other parts of the machine, if so desired. Upon the end of the main axle C, next to the platform, there is connected, by a toggle-joint, $i$, a pulley-frame, $j$, that carries a pulley-wheel, $k$, and from this pulley-frame $j$ there extends a rod, $l$, the upper end of which is united to the reel-shaft $e$. The object of this construction is to keep the pulleys $f$ $k$ in line, or nearly so, whilst the platform that controls one of them, and the axle or driving-wheels that control the other one, may be free to move, without straining or throwing off the belt that passes around these pulleys, the rod $l$ under any circumstances tending to keep the pulleys in line by swinging the pulley-frame $j$ on its toggle-joint, and the shaft 2, fig. 6, of the pulley $k$, with it.

The rake I, traverses over the platform E, upon ways $m$ $n$, and it has, moreover, a rising and falling motion upon the rod or way $m$, by means of guides and switches, as will be hereafter explained. The rake may be traversed over the platform to clear it of the cut grain, and returned for the next succeeding similar operation, by mechanism as follows: A bevel-gear, $o$, upon a shaft, $p$, may receive motion from an internal gear on the drive-wheel A, or in any other of the usual well-known ways; the shaft $p$ is connected to the shaft $q$, by a slip-joint, at $r$, that will allow the shafts to elongate or shorten, as it were, but still rotate together. The shaft $q$ is united by a toggle-joint, $s$, to a short shaft, $t$, carrying upon its extreme end a bevel-pinion, $u$, that meshes with and turns another bevel-pinion, $v$, on a vertical shaft, $w$, and the shaft with it. Upon this vertical shaft $w$, fig. 2, there is a pulley, $x$, around which and around a pulley, $y$, at the outer or grain side of the platform, an endless strap, belt, chain, or cord, $z$, passes, and which strap or cord has upon it a knot, swell, ring, or other projection, 3, fig. 2, that will catch and hold in the slot 4, in the head-plate 5, of the rake, whilst the strap or cord itself can freely pass through said slot; and this belt or strap z receives a continuous motion through the gearing and shafts above described.

The head-plate 5, to which the rake is attached, has a sleeve, 6, upon it, which sleeve moves upon the rod m, and this forms the hinge upon which the rake can rise up and drop down, when it is to return, after delivering one gavel, for another. The tail 7 of the rake, or that part of it which projects rearward of the sleeve or hinge-joint, rests, when the rake is clearing the platform, upon the outer guide or rail n, and is thus prevented from rising up whilst the button on the strap moves it along. But when the tail-piece 7 arrives at the point 8, on the rail n, it passes under a curved rod or wire, 9, and as the rail, just beyond that point, is rounded off or runs out, the rear end of the rake is drawn down, and its point raised up until it is in a vertical position, or nearly so, as shown in fig. 3. As the rake is raised up into this position, the recess 10 therein, against which the button or swell 3 was bearing to move the rake along, leaves the carrying-belt, or disconnects from it, and as the rake swings upward, its other slot, 4, receives or takes in the strap or belt z, and when the swell or button 3 comes against the head-plate, it carries the rake back to the outer side of the platform, where its rear end, 7, rides up on bent rods, wires, or ways 11, and the rake drops down on to the platform again. In dropping down, the slot 4 leaves the carrying-belt, and when the button or swell comes around, it takes against the head-plate, whilst the strap or belt passes into the recess 10, and again moves the rake towards the delivery-point.

Upon the under side of the sleeve 6 there is a circular projection, 12, which has a shoulder, 13, in it. When the rear end, 7, of the rake begins to run down the cam or inclined ways 9, this projection 12 takes against a spring, 14, and compresses it. As the rake continues to rise up towards its vertical position, the projection 12 rolls upon the spring, until the shoulder 13 comes around, when, the spring being released, rises into or against the shoulder, and holds the rake in its partially-raised position, until the button passes around the pulley, and takes against the rake-head plate and moves the rake. The rake continues to rise into a more vertical position, until its projection 7 takes into the groove 15, and this holds it up until the groove runs out, and the projection takes the guides 11, to drop the rake on the platform again.

It will be perceived that whilst the motion of the carrying-belt z is continuous, the rake stands still for a period at each end of its traverse. This makes a simple and efficient movement, without requiring the rake-gearing to be thrown in and out, as the case may be. But my rake may be operated quite as well from a clutch-gearing that is automatically thrown out and in, as follows: A shaft, J, may be rotated from the main drive-wheels, through its pulley, K, or otherwise, and a belt or shafting may run from the shaft K, directly to the shaft w, that drives the carrying-belt z, and thus move the belt. In this case a clutch, L, would be used that would be thrown out by a cam-projection, M, on the wheel N, taking against a shoulder on the spring-arm O, pivoted to the clutch-fork P, and moving out that part of the clutch attached to the wheel N. When the clutch was out of gear, the rake would cease to work, and when it was to be thrown into action again, the pinion Q, working in the rack R, moves the rack, and the rack being connected to the wheel N by a pitman, S, the wheel would be turned to move its cam out of the way, and then the clutch would spring into action, and the rake again move.

I do not in this application make any claim to this clutch-gear, but describe it to show how the rake could be operated intermittently by gears, and a clutch thrown in and out automatically. The projection of the rake rearward, instead of being straight may be curved, and catch and hold under instead of on top of the ways; and the top of the reel-post should be braced to the gearing on the platform or elsewhere, to give it sufficient rigidity; but these things are obvious to any constructor, and need not be further mentioned.

Having thus fully described my invention, what I claim therein as new, and desire to secure by Letters Patent, is—

1. The combination of the toggle-frame pulley and guide-rod, upon the end of the main axle, for keeping the driving and reel-pulleys in line, when the reel-post is arranged upon the drag-bar, and remote from and in a different plane from that of the axle, and thus preventing the belt from being thrown off, or from slipping or binding, whilst the platform and driving-wheels accommodate themselves to the inequalities of the ground over which they are passing, as described.

2. I also claim, in combination with a rake, moving on the rod n, by the endless belt z, the projection rearward of said rake, as shown at 7, and the slots 4, 10, and shoulder 13, for the purpose of guiding, holding, and turning the rake, by means of the ways herein described and represented.

3. I also claim, in combination with the projection on the rake-plate or hinge, and its shoulder 13, the spring-way or guide 14, for holding up, guiding, and controlling the rake just before its projection takes the straight groove or way 15, and until the button on the belt moves around to cause it to return for the next gavel, substantially as described.

ROBERT D. BROWN.

Witnesses:
WM. F. HENDERSON,
OLIVER BEARD.